C. E. WEHRENBERG.
BALING PRESS.
APPLICATION FILED JULY 3, 1908.

918,620.

Patented Apr. 20, 1909.
3 SHEETS—SHEET 2.

Witnesses
A. J. McCauley
George Ladson

Inventor:
Chas. E. Wehrenberg
by Bakewell & Cornwall
Attys.

C. E. WEHRENBERG.
BALING PRESS.
APPLICATION FILED JULY 3, 1908.
918,620.
Patented Apr. 20, 1909.
3 SHEETS—SHEET 3.
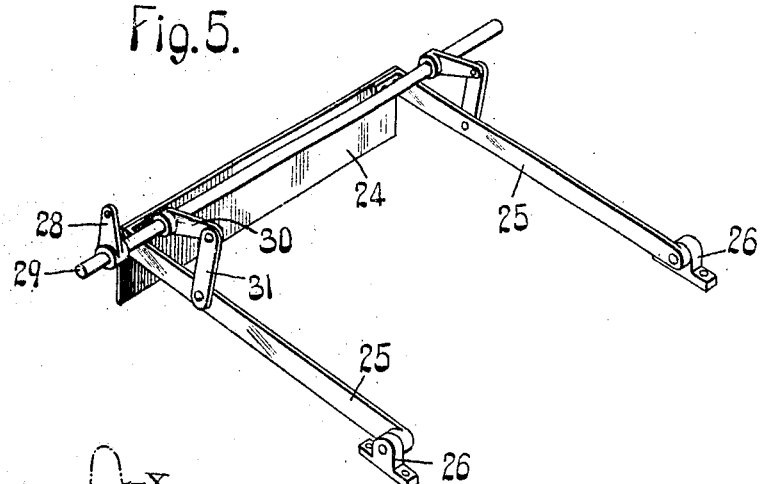
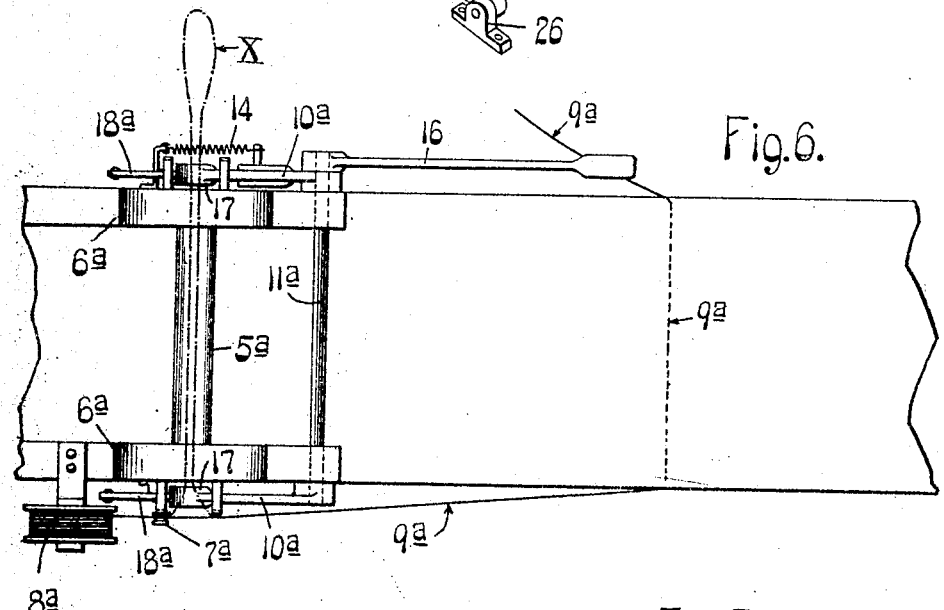
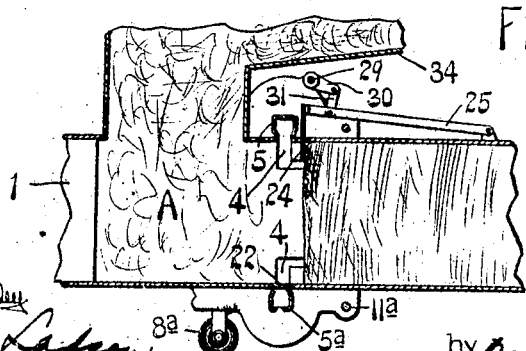
Witnesses
C. J. McCauley
George Lahm
Inventor:
Chas. E. Wehrenberg
by Bakewell & Cornwall Attys.

UNITED STATES PATENT OFFICE.

CHARLES E. WEHRENBERG, OF MOUND CITY, ILLINOIS, ASSIGNOR TO BELLEVILLE BALER COMPANY, OF BELLEVILLE, ILLINOIS, A CORPORATION OF ILLINOIS.

BALING-PRESS.

No. 918,620.          Specification of Letters Patent.          Patented April 20, 1909.

Application filed July 3, 1908. Serial No. 441,798.

*To all whom it may concern:*

Be it known that I, CHARLES E. WEHRENBERG, a citizen of the United States, residing at Mound City, Pulaski county, Illinois, have invented a certain new and useful Improvement in Baling-Presses, of which the following is a full, clear, and exact description, such as will enable others skilled in the art to which it appertains to make and use the same, reference being had to the accompanying drawings, forming part of this specification, in which—

Figure 1:
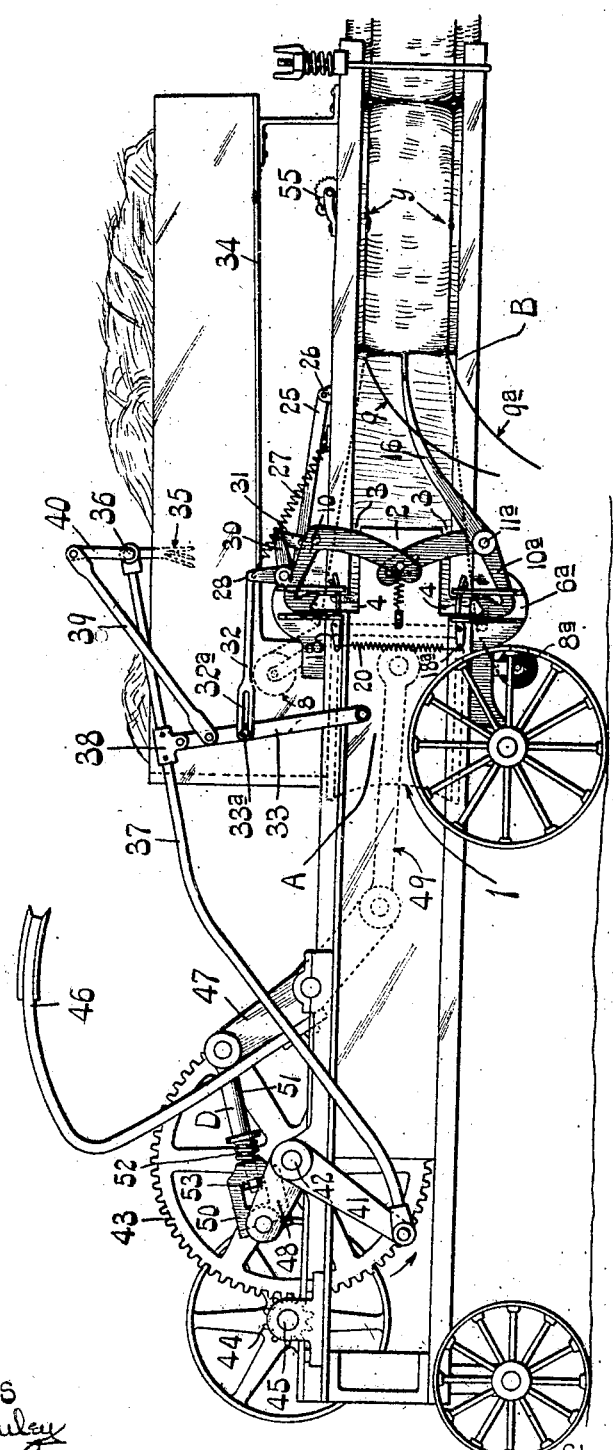
Figure 2:
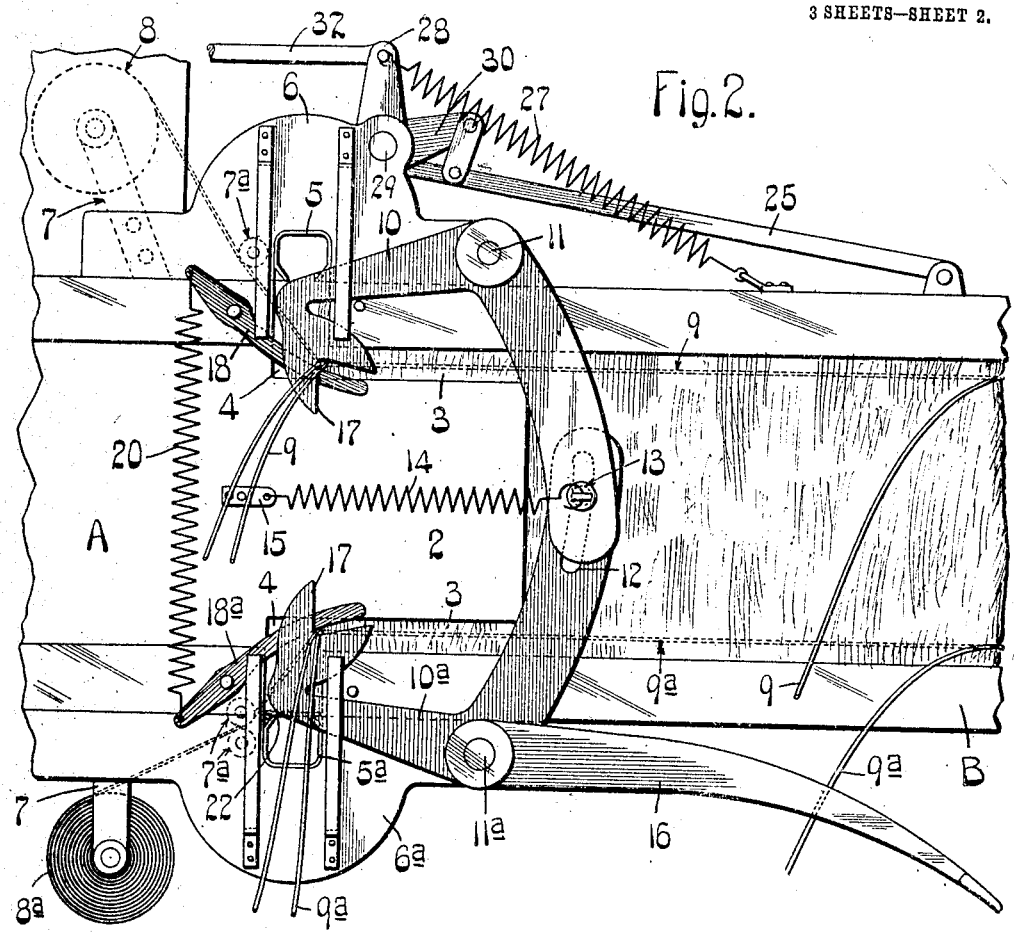
Figure 3:
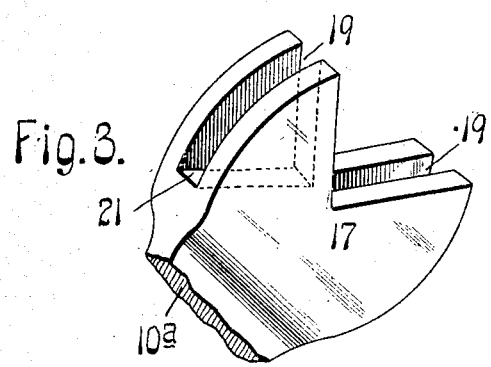
Figure 4:
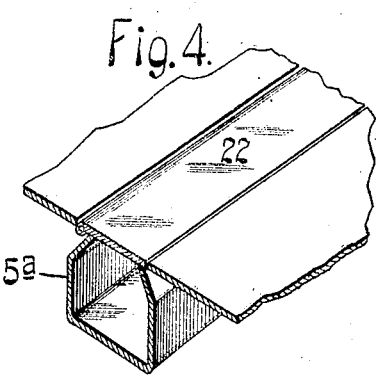

Figure 1 is a side elevation of a baling press constructed in accordance with my invention; Fig. 2 is an enlarged detail side elevational view of a portion of the press shown in Fig. 1; Fig. 3 is a perspective view of the jaw of one of the arms that positions the wires or cords that extend around the bale; Fig. 4 is a detail perspective view of the lower wire-holder; Fig. 5 is a perspective view of the tucker; Fig. 6 is a bottom plan view of a portion of the baling press shown in Fig. 1; and Fig. 7 is a vertical longitudinal sectional view of a portion of said press.

This invention relates to baling presses.

One object of my present invention is to provide a baling press of great capacity which is so constructed that it is not necessary to place divisional blocks or boards between the bales during the operation of forming them.

Another object is to provide a baling press which is so constructed that a single operator can place and fasten the tie wires which extend around the bales.

Another object is to provide a baling press having means for tucking down the material at the rear end of a bale so as to form a square corner, and thereafter arranging the tie wires transversely across the end of the bale. And still another object is to provide a baling press having means for supporting the tie wires transversely of the baling chamber out of the path of the compressor or plunger which compresses the material, and means for moving said tie wires into position so that they will lie between the abutting ends of two bales.

Other objects and desirable features of my invention will be hereinafter pointed out.

Briefly described, my improved baler consists of a baling chamber in which a plunger or compressor operates to compress the material, a tying chamber into which the compressed material is forced from the baling chamber, means for holding the tie wires transversely of the baling chamber out of the path of movement of the plunger or compressor, and means for moving said tie wires into the baling chamber so that they will be arranged between the abutting ends of two bales. The machine is also provided with an automatically operated device that tucks down the material at the rear end of a bale so as to form a square corner. Means is also provided for moving charges of material from a platform or support into the hopper of the baling chamber, and a beater of novel construction is provided for forcing said charges down into the baling chamber into the path of the compressor.

Referring to the drawings which illustrate the preferred form of my invention, A designates the baling chamber of the press, and 1 designates a compressor or plunger that operates in said baling chamber to compress or compact the material and force it into a tying chamber B which is located adjacent the rear end of the baling chamber, said tying chamber being formed by a pair of members that are channel-shaped in cross section and arranged with their legs projecting toward each other. The side walls of the baling chamber are provided with extensions 2 that extend between the channel-shaped members which form the tying chamber, and said extensions are spaced away from the legs or flanges of said members to form horizontally disposed slots 3 that communicate with vertically disposed slots 4 in the side walls of the baling chamber, as shown clearly in Figs. 1 and 2. The top and bottom walls of the baling chamber A are provided with transversely extending slots that communicate with the slots in the side walls of said chamber and upper and lower wire-holders or casings 5 and 5ª are arranged transversely of the baling chamber so as to cover the transversely extending slots in the top and bottom walls thereof. The tie wires or cords that extend around the bale are arranged in said wire-holders, and means, hereinafter described, is provided for moving the wires out of said holders into the baling chamber. The wire-holders are open at both ends and are of approximately channel shape in cross section, the holder 5 being arranged with its legs projecting downwardly and the holder 5ᵃ with its legs projecting upwardly. The legs or side walls of said wire-holders 5 are preferably contracted slightly, as shown in Fig. 2, so as to guide the wire into the baling chamber, and while I have herein shown wire-holders of approximately channel shape in cross section, I do not wish it to be understood that my broad idea is limited to such a construction for these wire-holders could be constructed in numerous ways without departing from the spirit of my invention. The wire-holders 5 and 5ᵃ are carried by members 6 and 6ᵃ, respectively, which are connected to the top and bottom walls of the baling chamber, said members also carrying the channel-shaped members that form the tying chamber B.

The members 6 and 6ᵃ at one side of the baling chamber are provided with supports 7 on which wire reels 8 and 8ᵃ are mounted, and rollers 7ᵃ are arranged adjacent said reels for guiding the wires, the wire 9 that leads from the reel 8 forming the upper wire of the bale, and the wire 9ᵃ that leads from the reel 8ᵃ forming the lower wire of the bale. These wires are drawn through the wire-holders 5 and 5ᵃ so that they extend transversely of the baling chamber, and at the proper time in the cycle of operations of the machine said wires are forced out of said holders into the baling chamber by means of wire placers which I will now describe.

The wire placers which engage the upper tie wire 9 and move it downwardly out of the wire-holder into the baling chamber, consist of a pair of arms 10 arranged adjacent the opposite sides of the baling chamber and being connected to a horizontally disposed rock shaft 11 which is journaled in the members 6 that carry the upper wire-holder 5. A similar pair of arms 10ᵃ are arranged adjacent the opposite sides of the baling chamber for forcing the lower wire 9ᵃ from its holder up into the baling chamber, said arms 10ᵃ being connected to a rock shaft 11ᵃ which is journaled in the members 6ᵃ that carry the lower wire-holder. The arms 10 and 10ᵃ at one side of the press are of approximately bell crank shape, as shown in Figs. 1 and 2, and the inwardly projecting portions of said arms are provided with slots 12 through which a pin 13 passes to connect said arms together and cause the rock shafts 11 and 11ᵃ to move in unison. A spring 14 which has one of its ends connected to the pin 13 and its opposite end connected to a stationary bracket 15 on the side of the baling chamber, rocks the shafts 11 and 11ᵃ in one direction so as to move the arms 10 and 10ᵃ at each side of the baling chamber away from each other, and said shafts are rocked in the opposite direction to move said arms toward each other by means of a lever 16 that is secured to one end of the shaft 11ᵃ, as shown in Figs. 1 and 2, the movements of the arms being limited by suitable stops.

Each of the arms 10 and 10ᵃ is provided with an approximately V-shaped jaw 17, as shown in Fig. 3, for engaging the wire which said arm positions, and a clamping device coöperates with said jaw to prevent the wire from slipping out of same while it is being moved into the baling chamber. In the construction herein shown said clamping devices consist of pairs of levers 18 and 18ᵃ arranged at the opposite sides of the baling chamber and projecting into slots 19 in the jaws 17 of the arms 10 and 10ᵃ as shown clearly in Fig. 2. Said levers 18 and 18ᵃ are pivotally connected intermediate their ends to the side walls of the baling chamber, and the front ends of each pair of levers are connected together by a spring 20. The levers 18 at each side of the press normally extend across the vertically disposed slots 4 in the upper edge of the side walls of the baling chamber at a point below the upper wire-holder 5, and the levers 18ᵃ at each side of the press extend across the slots 4 in the lower edge of said side walls at a point above the lower wire-holder 5ᵃ, the upper and lower tie-wires being arranged between said levers and the jaws of the arms 10 and 10ᵃ which coöperate with said levers.

When the arms 10 and 10ᵃ are moved toward each other, the jaws on said arms will first engage the wires and move them out of the wire-holders into engagement with the levers 18 and 18ᵃ so that the wires will be clamped securely between said jaws and levers. The movement of the arms 10 and 10ᵃ toward each other rocks the levers 18 and 18ᵃ on their fulcrums so that the wires are clamped securely while they are being moved into the baling chamber. At about the time the wires have reached the inner ends of the horizontally disposed slots 3 in the side walls of the baling chamber, the levers 18 and 18ᵃ pass out of engagement with the wires so as to release said wires and permit them to move with the material that is being forced from the baling chamber into the tying chamber. The means herein shown for causing the arms 18 and 18ᵃ to release the wires, consists of a shoulder 21 on each of the jaws 17 that comes into contact with the lever with which said jaw coöperates and moves said lever away from the jaw, said shoulder being so formed that the lever moves away from the jaw when the wire comes into alinement with the horizontally disposed slot 4 in the side wall of the baling chamber.

When the arms 10 and 10ᵃ are returned to their normal position the levers 18 and 18ᵃ will also be returned to their normal position by means of the springs 20. I prefer to provide the lower wire-holder 5ᵃ with a hinged door 22, as shown in Fig. 4, so as to prevent chaff and dirt from clogging up said wire-holder. This door extends flush with the bottom wall of the baling chamber, and when the lower wire 9ª is moved upwardly, it engages the door and swings it upwardly, the door dropping back to its closed position after the lower wire has passed into the baling chamber.

Having described the construction of the wire-placing mechanism, I will now describe the operation of same. The operator draws the ends of the upper and lower wires through the wire-holders so that the ends of said wires will project some distance laterally from the ends of said holders, the operator standing at the side of the machine which is shown in elevation in Fig. 1. When sufficient material has been forced into the tying chamber B to form practically a solid wall or abutment with which the plunger 2 coöperates to compress the material, the operator depresses the lever 16 and thus rocks the shafts 11 and 11ª simultaneously so that the arms 10 and 10ª will move toward each other. The jaws on said arms engage the upper and lower wires and move them out of the wire-holders, the inward movement of said arms bringing the wires into engagement with the levers 18 and 18ª so that the wires are clamped securely in the jaws 17 of the arms 10 and 10ª. When the wires come into alinement with the horizontally disposed slots 3 the levers 18 and 18ª move automatically away from their coöperating jaws so as to release the wires and permit them to move with the material into the tying chamber. As the material is forced through the tying chamber, the wires will be drawn automatically from the reels and thus be arranged longitudinally on one side of the bale, as shown in dotted lines in Fig. 2, and in full lines in Fig. 6. Before the bale has been completed the operator reaches through the wire-holders and engages the upper and lower wires and draws them through said holders so as to form loops X in said wires, as shown in Fig. 6. He then severs these loops and when enough material has been forced into the tying chamber to form a bale he operates the lever 16 so as to force the two strands of wire which extend through each of the wire-holders into the baling chamber, as shown in Fig. 2, one portion of each loop extending across the rear end of the bale that has just been completed and the other portion of each loop extending across the front end of the next bale that is to be formed. The operator then connects the free ends of the upper and lower wires together at y, as shown in Fig. 1, while the bale that has just been formed is traveling through the tying chamber, these operations being repeated for each bale that is formed.

Any suitable kind of an implement can be used to pull the wires through the wire-holders to form loops in the wires, said implements being operated either manually or by some suitable mechanical means, not shown. While I have herein referred to wires as being used for holding the material in the bale together, it will, of course, be understood that cords could be used instead of the wires.

I prefer to provide the baling press with a tucker that tucks the material down into the baling chamber so as to produce a bale having square and smooth corners. This tucker consists of a blade 24 mounted on a pair of arms 25 that are pivotally connected to brackets 26 on the upper side of the tying chamber, said blade being forced downwardly through a slot in the top wall of the baling chamber, as shown in Fig. 1, so as to tuck down any material that the plunger 1 has failed to compact. That is to say, when the plunger moves into the baling chamber to compress the material, some of the material is apt to project through the opening in the top wall of the baling chamber into which the material is fed and thus not be compressed. The result is that the upper edge of the rear end of the bale will be ragged. My tucking device overcomes this objectionable feature for the blade 24 moves down over the upper edge of each charge of material that is compressed and thus folds down any projecting portions of material so that a square and smooth corner is produced. The upper tie wire is moved down into position as soon as the tucking blade is elevated so that the material that has been tucked down will be confined by said wire. The tucking blade also prevents the material that has been compressed from following the plunger when it is withdrawn from the baling chamber.

Baling presses that have heretofore been in general use placed a board having slots in it, down through the feed opening into the baling chamber. This necessitated stopping the feeding of material and letting the plunger make enough strokes to clear up the feed opening to give the board free passage. Consequently, from one to three feeds or charges of material was lost in forming each bale. No division boards are used in my improved baler; it is therefore not necessary to give each bale an extra blow, and as every movement of the plunger 1 compresses a charge of material the capacity of the baler is much greater than those which have heretofore been in use.

The means for operating the tucking blade to force it downwardly consists of a spring 27 connected to an arm 28 on a rock shaft 29 provided with arms 30 that are connected by means of links 31 to the arms 25 which carry the tucking blade. Said blade is elevated by means of a link 32 connected at one end to the arm 28 and at its other end to a rock arm 33 which forms part of the means for moving the material to be compressed, from a platform into the hopper of the baling chamber, the link 32 being provided with an elongated slot 32ᵃ through which a pin 33ᵃ on the link 33 extends.

The material to be baled is deposited on a platform 34 either by pitching it manually onto same, or by some suitable feeding apparatus, and the material is then drawn or moved from said platform into the hopper of the baling chamber by means of a feeding device consisting of a pronged member 35 connected to a rock shaft 36 which is journaled in a bearing on the end of a long pitman or rod 37. The rod 37 passes through a bearing 38 that is pivotally connected to the upper end of the rock arm 33 to which the tucker blade actuating link is connected, and a link 39 is connected to said rock arm 33 and to the upper end of an arm 40 on the rock shaft 36 for actuating said rock shaft. The pitman or rod 37 is connected to an arm 41 on a rotatable shaft 42 provided with a large gear wheel 43 that meshes with a pinion 44 on the drive shaft 45 of the press so that a reciprocating movement will be imparted to the pitman 37 and thus cause the pronged member 35 to engage the material lying on the platform or support 34 and move it into the hopper of the baling chamber. The material that is drawn into said hopper is forced down into the path of movement of the plunger 1 by means of a beater 46 which is rigidly connected to a rock lever 47 that is oscillated by means of a link D which is connected to said rock lever and to an arm 48 on the shaft 42, as shown clearly in Fig. 1, the plunger or compressor 1 being connected to the lower end of said rock lever 47 by means of a link 49. I prefer to form the link D in such a manner that the rock lever 47 can give or yield slightly in case the beater 46 comes into contact with an obstruction that is too solid for it to pass through, and to this end I have formed the link D of two sections 50 and 51 provided with shoulders between which a compression spring 52 is interposed. The section 51 is provided with an adjustable stop 53 that is engaged by a shoulder on the section 50 when the rock lever 47 is being moved in the direction for forcing the plunger 1 into the baling chamber so that at such times the link D is practically rigid. When the rock lever 47 is being moved in the opposite direction the movement of the section 50 of link D will be transmitted to the section 51 through the spring 52 so that the lever 47 and beater 46 can yield in case the beater comes in contact with a solid obstruction.

The pronged member 35 automatically moves a charge of material from the platform 34 into the hopper of the baling chamber and said charge is then forced down into the baling chamber by means of the beater 46. The compressor or plunger then moves into the baling chamber to compress the charge, and as the plunger moves out of the baling chamber the tucking blade 24 descends to wipe down the upper edge of the charge that has just been compressed. The spring 27 moves the tucking blade downwardly, as previously described, and said blade is returned to its elevated position when the pronged member 35 is moving the charge of material into the hopper of the baling chamber. The operator arranges the upper and lower wires in the wire-holders, as previously described, and at the proper time depresses the lever 16 so that said wires will be positioned properly across the ends of the bale, the press being provided with some suitable kind of a signaling device 55 for notifying the operator when to depress the lever 16.

As previously stated, a baling press of the construction above described has a greater capacity than the balers heretofore in use because every movement of the plunger 1 compresses a charge of material; it overcomes the necessity of using division boards or blocks between the bales so that fewer operatives are required to run the press. It produces a bale having square and smooth corners, and requires only one operator to fasten the tie wires for the operator has sufficient time to arrange the wires in the wire-holders and also fasten the ends of said wires together, as the bale is traveling through the tying chamber.

Having thus described my invention, what I claim as new and desire to secure by Letters Patent is:

1. A baling press comprising a plunger, means for holding a strand of wire transversely of the press out of the path of movement of the plunger, and means for moving said wire into the path of movement of said plunger so that said wire will extend across the end of a bale; substantially as described.

2. A baling press having a baling chamber that is provided in its top and bottom walls with transversely extending openings which permit the tie wires to be moved into said chamber; substantially as described.

3. A baling press provided with means for arranging the tie wires transversely of the baling chamber out of the path of movement of the compressor or plunger, and means for moving said wires into said baling chamber so that they will lie between the abutting ends of two bales; substantially as described.

4. A baling press provided with means for supporting coils of wire, means for arranging said wires transversely of the baling chamber out of the path of movement of the compressor, and means for moving said wires into the baling chamber so that they will extend across the end of a bale and be drawn automatically from the reels and stretched longitudinally of the bale as it is being forced through the tying chamber of the press; substantially as described.

5. A baling press provided with means which enables an operator to arrange the tie wires transversely of the baling chamber out of the path of movement of the compressor and thereafter move said strands into the baling chamber so that they extend transversely across the ends of the bale, and finally connect the ends of said strands together at one side of the bale; substantially as described.

6. A baling press provided with wire-holders that extend transversely of the baling chamber out of the path of movement of the compressor for receiving the tie wires that extend around the bale; substantially as described.

7. A baling press provided with a baling chamber having openings in its top and bottom walls, and wire-holders arranged transversely of the baling chamber adjacent said openings; substantially as described.

8. A baling press provided with a baling chamber, devices arranged adjacent the opposite sides of said chamber for gripping tie wires that extend transversely of said chamber, and means for actuating said devices to force said tie wires into the path of movement of the material that is being compressed so that said wires will be arranged across the ends of the bales; substantially as described.

9. A baling press provided with means for holding loops of tie wire transversely of the baling chamber out of the path of movement of the compressor, and means for moving said wires into the path of movement of the material that is being compressed so that one portion of each loop will be arranged transversely across the rear end of one bale and the other portion of each loop will be arranged transversely across the front end of the succeeding bale; substantially as described.

10. A baling press having a baling chamber provided in its top and bottom walls with transversely extending openings, and means for engaging tie wires that extend transversely of the baling chamber and forcing them through said openings into the baling chamber; substantially as described.

11. A baling press provided with wire-holders that extend transversely of the baling chamber adjacent to openings in the top and bottom walls of said chamber, and means for moving the wires from said holders into the baling chamber; substantially as described.

12. A baling press provided with a baling chamber, pairs of devices arranged adjacent the sides of said chamber for engaging wires that extend transversely across the top and bottom of said chamber and moving them into the path of the material that is being compressed, and means cooperating with said devices for clamping the wires while they are being moved into the path of said material; substantially as described.

13. A baling press provided with a baling chamber, wire-positioning means consisting of pairs of arms arranged adjacent the opposite sides of said chamber, and means for causing said arms to move simultaneously; substantially as described.

14. A baling press provided with a baling chamber, wire-positioning means consisting of pairs of arms arranged adjacent the opposite sides of said chamber, means for causing said arms to move simultaneously, jaws on said arms for engaging the wires, and devices cooperating with said jaws for clamping the wires therein; substantially as described.

15. A baling press provided with a baling chamber, wire-positioning means consisting of pairs of arms arranged adjacent the opposite sides of said chamber, means for causing said arms to move simultaneously, jaws on said arms for engaging the wires, devices cooperating with said jaws for clamping the wires therein, and means for causing said devices to move away from said jaws when the arms reach a certain position; substantially as described.

16. A baling press provided with wire-positioning means which consists of a pair of rock shafts having arms connected thereto, and means for causing said shafts to rock simultaneously in opposite directions; substantially as described.

17. A baling press provided with wire-positioning means consisting of pairs of oppositely disposed arms, rock shafts to which said arms are connected, means for actuating said rock shafts simultaneously to move said arms toward each other, and yielding means for restoring said rock shafts to normal position; substantially as described.

18. A baling press provided with wire-positioning means comprising a pair of rock shafts having pairs of oppositely disposed arms connected thereto, one arm on each of said shafts being of bell crank shape, a pin extending through elongated slots in the inwardly projecting portions of said bell cranks, a spring connected to said pin and to a stationary support, and an operating lever on one of said shafts; substantially as described.

19. A baling press provided with wire-positioning means, comprising pairs of oppositely disposed rock arms provided with bifurcated jaws, and pivotally mounted levers cooperating with said arms and adapted to enter the openings in said jaws to clamp the wires in said jaws; substantially as described.

20. A baling press provided with wire-positioning means comprising pairs of oppositely disposed rock arms provided with jaws in which slots are formed, pivotally mounted levers adapted to enter the slots in said jaws, and shoulders on said jaws which cause said levers to move away from the jaws when the rock arms reach a certain position; substantially as described.

21. A baling press provided with wire-positioning means comprising pairs of oppositely disposed rock arms provided with jaws, pivotally mounted levers coöperating with said jaws for clamping the wires arranged in said jaws, and yielding connections between said levers; substantially as described.

22. A baling press provided with a baling chamber, open-ended wire-holders arranged transversely of the baling chamber adjacent openings in the top and bottom walls thereof, positioning devices arranged adjacent the opposite sides of the baling chamber for clamping the wires in the wire-holders and moving said wires into the baling chamber, and means for causing said positioning devices to release said wires after they have entered the baling chamber; substantially as described.

23. A baling press provided with a baling chamber having open-ended wire-holders arranged transversely thereof, reels arranged adjacent one end of said wire-holders for supporting coils of wire, and means for guiding the wire from said reels into said wire-holders; substantially as described.

24. A baling press provided with a baling chamber, wire-holders arranged transversely of the baling chamber outside of the top and bottom walls thereof and adjacent to slots in said wall, and a movable door covering the slot in the bottom wall of said baling chamber; substantially as described.

25. A baling press provided with a baling chamber having a feed-opening in the top wall thereof, a plunger operating in said chamber to compress charges of material, a tucking device that normally lies outside of said chamber, and yielding means for forcing said tucking device down into the baling chamber so that it will extend over the upper edges of the charges of material that the plunger compresses; substantially as described.

26. A baling press provided with a baling chamber having a feed-opening in the top wall thereof, a plunger operating in said chamber to compress charges of material, a tucking device that normally lies outside of said chamber, yielding means for automatically moving the tucking device downwardly into the baling chamber to tuck down the charges of material that the plunger compresses, and means independent of the plunger for restoring said tucking device to its normal position; substantially as described.

27. A baling press provided with a baling chamber, a plunger operating in said baling chamber to compress charges of material, a tucking device that normally lies out of the path of movement of the plunger, and automatic means for causing said tucking device to enter the baling chamber and move downwardly as the plunger recedes from the material so as to tuck down the upper edges of the charges of material that the plunger compresses and thus prevent the material from following the plunger; substantially as described.

28. A baling press provided with a baling chamber, a plunger operating in said baling chamber to compress charges of material therein, a pair of pivotally mounted arms arranged above the baling chamber and provided with a tucking blade which is adapted to enter the baling chamber to tuck down the charges of material that the plunger compresses, and means for operating said arms intermittently; substantially as described.

29. A baling press provided with a baling chamber, a plunger operating in said baling chamber to compress charges of material therein, a pair of pivotally mounted arms arranged above the baling chamber and provided with a tucking blade which is adapted to enter the baling chamber to tuck down the charges of material that the plunger compresses, a rock shaft connected to said arms, and means for operating said rock shaft intermittently; substantially as described.

30. A baling press provided with a baling chamber, a plunger operating in said baling chamber to compress charges of material therein, pivotally mounted arms provided with a tucking blade which is adapted to enter the baling chamber to tuck down the charges of material that the plunger compresses, a rock shaft, a connection between said rock shaft and said arms, yielding means for moving the rock shaft in one direction, and positive means for moving the rock shaft in the opposite direction; substantially as described.

31. A baling press provided with a baling chamber, a plunger operating in said baling chamber to compress charges of material therein, an automatically operated tucking device which enters the baling chamber to tuck down the upper edges of the charges of material that the plunger compresses, and means for arranging a tie-wire transversely across the material that the tucker has folded over or tucked down; substantially as described.

32. A baling press provided with a baling chamber, a plunger operating in said baling chamber to compress charges of material therein, an automatically operated tucking device which enters the baling chamber to tuck down the upper edges of the charges of material that the plunger compresses, wire-holders extending transversely of the baling chamber for receiving tie-wires, and means for forcing said tie-wires out of said holders and into the baling chamber so that they will extend transversely across the end of the bale; substantially as described.

33. A baling press provided with a baling chamber, a plunger operating in said baling chamber, an operating lever for imparting movement to said plunger, a feeder rigidly connected to said operating lever for forcing charges of material down into the baling chamber, a rotating member, and yielding connection between said rotating member and said operating lever; substantially as described.

34. A baling press provided with a baling chamber, a plunger operating in said baling chamber, an operating lever for imparting movement to said plunger, a feeder rigidly connected to said operating lever for forcing charges of material down into the baling chamber, a rotating member for actuating said operating lever, and means for enabling said operating lever to yield or give slightly in case the feeder comes in contact with a solid obstruction; substantially as described.

35. A baling press provided with a baling chamber, a plunger operating in said baling chamber, an operating lever for imparting movement to said plunger, a feeder rigidly connected to said operating lever for forcing charges of material down into the baling chamber, a rotating member, a two-part link connected to said rotating member and to said operating lever, and a spring interposed between shoulders on the two parts of said link; substantially as described.

36. A baling press provided with a baling chamber, a plunger operating in said baling chamber, an operating lever for imparting movement to said plunger, a feeder rigidly connected to said operating lever for forcing charges of material down into the baling chamber, a rotating member, a two-part link connected to said rotating member and to said operating lever, a spring interposed between shoulders on the two parts of said link, and a stop on one part of said link which engages a shoulder on the other part of the link when the link moves in one direction; substantially as described.

37. A baling press provided with a baling chamber having a feed-opening therein, a platform onto which the material to be compressed is deposited, a reciprocating link or pitman carrying a member which engages the material on the platform and feeds it to the opening in the baling chamber, and a rock arm provided with a pivotally mounted bearing in which said rod or pitman is arranged; substantially as described.

38. A baling press provided with a baling chamber, a tying chamber located adjacent to the baling chamber, the side walls of said baling chamber being provided with vertically disposed slots which communicate with horizontally disposed openings in the side walls of the tying chamber, and wire holders arranged transversely of the baling chamber and communicating with said vertically disposed slots; substantially as described.

39. A baling press provided with a baling chamber, members connected to the top and bottom walls of said baling chamber adjacent transversely extending slots therein, a tying chamber carried by said members, and wire-holders arranged transversely of the baling chamber and connected to said members; substantially as described.

40. A baling press provided with a baling chamber, members connected to the top and bottom wall of said baling chamber, wire-holders arranged transversely of the baling chamber and connected to said members, and rock shafts journaled in said members and provided with wire-positioning arms; substantially as described.

In testimony whereof I hereunto affix my signature in the presence of two witnesses, this thirtieth day of June 1908.

CHARLES E. WEHRENBERG.

Witnesses:
HELEN S. DAUGHERTY,
A. J. McCAULEY.